United States Patent

Jones et al.

[11] 4,124,892
[45] Nov. 7, 1978

[54] DATA PROCESSING SYSTEMS

[75] Inventors: John A. Jones, Stockport; Brian J. Procter, Hyde, both of England

[73] Assignee: International Computers Limited, London, England

[21] Appl. No.: 778,478

[22] Filed: Mar. 17, 1977

[30] Foreign Application Priority Data

Mar. 18, 1976 [GB] United Kingdom ............ 10865/76

[51] Int. Cl.$^2$ ...................... G06F 11/00; G06F 13/00
[52] U.S. Cl. ...................................... 364/200; 364/900
[58] Field of Search .................... 364/200 MS File; 364/900 MS File

[56] References Cited

U.S. PATENT DOCUMENTS

| 3,409,877 | 11/1968 | Alterman et al. ................ 340/172.5 |
| 3,533,082 | 10/1977 | Schnabel et al. ................ 340/172.5 |
| 3,753,244 | 8/1973 | Sumilas et al. .................... 340/172.5 |

Primary Examiner—Gareth D. Shaw
Assistant Examiner—C. T. Bartz
Attorney, Agent, or Firm—Hane, Roberts, Spiecens & Cohen

[57] ABSTRACT

A data processing system is disclosed in which a store has a plurality of pairs of storage locations. An indicator is provided for each location pair to indicate which location of the pairs is to be used for read and write accesses. The indicators are each set to indicate that after a write access to a pair of locations, read accesses are to take place to the location of the pair currently indicated for write accesses and periodically, for example at the end of a sequence of instructions, the indicators are set to indicate that write accesses are to take place to the opposite location of the pair to that which is currently indicated for read accesses.

3 Claims, 3 Drawing Figures

DATA PROCESSING SYSTEMS

BACKGROUND OF THE INVENTION

Field of the Invention

This invention relates to data processing systems.

In data processing systems, it is often possible for the execution of a program to be interrupted for various reasons, such as in the event of an error or some other form of immediate interrupt request. In such an event, when the program is resumed after servicing of the interrupt, it will usually be necessary to "roll back" the program, i.e. to restart it at some point prior to that at which it was interrupted. For example, if the interrupt occurred because of an error, the result of the last instruction to be executed might not be valid, and so it will be necessary to roll back the program to re-try at least that instruction.

An extreme form of such roll-back action would be to restart the whole program again from the beginning, but such action would clearly be inefficient. Another technique which has been used is that of "program checkpointing". In this technique, checkpoints are introduced into the program at spaced intervals and, at each checkpoint, all the information necessary to restart the program from that checkpoint is stored in a back-up store.

Another technique, which has been proposed is to provide a number of specially dedicated back-up registers into which the contents of various data registers are automatically gated at regular intervals. This information is thus preserved, and is automatically gated back into the data registers from the back-up registers in the event of a re-try.

One object of the invention is to provide a novel way of preserving information for use in possible roll-back operation, which avoids the necessity for transferring the information into back-up storage.

SUMMARY OF THE INVENTION

According to the invention, there is provided a data processing system including a store containing a plurality of individually accessible locations, the system being arranged to execute instructions at least some of which initiate accesses to the store, wherein at least some of the locations are arranged in pairs, each pair having an associated indicator for indicating which location of that pair is to be used for read accesses and which for write accesses, and wherein in response to a write access to one of the pairs of locations the associated indicator is set to indicate that read accesses are now to take place to the same location of the pair as that which is currently indicated for write access, and each indicator is set periodically to indicate that write accesses are now to take place to the opposite location of the pair to that which is currently indicated for read access.

It will be seen that the effect of this is that at any given time, one location in any given pair will hold the current value of a particular variable and, if the value of that variable has been altered since the last periodic setting of the indicators, the other location will preserve the initial value of that variable.

It should be noted, however, that neither member of the pair has a fixed role: sometimes the current value will be in one location of the pair, sometimes in the other. The system automatically ensures that the current member of the pair is used when it is desired to read the current value. Because of this, it is not necessary to transfer information from one location of the pair to the other to preserve the initial value or to restore the initial value in the event of roll-back.

In a particular embodiment of the invention, the data processing system includes a microprogrammed processing unit, having a microprogram instructions for the execution of higher level instructions. In this embodiment, the periodic setting of the indicators is conveniently effected at the end of execution of each higher-level instruction i.e. at the end of performance of the microprogram sequence necessary for the execution of the higher-level instruction. In this way, if the execution of the higher-level instruction is interrupted for any reason the initial values of the variables in the pairs of locations will be preserved for re-try of that higher-level instruction.

In a preferred embodiment of the invention each indicator comprises two bistable devices respectively holding a use bit and a modifier bit, the periodic setting of the indicator comprising setting the modifier bit to a value equal to the non-equivalence function of the use bit and the modifier bit and then setting the use bit to a value representing binary zero, and the use bit being set to a value representing binary one whenever a write access is made to the associated pair of locations, the non-equivalence function of the use bit and the modifier bit thus providing an indication of which location of the pair is to be used for read accesses, and the inverse of the modifier bit providing an indication of which location of the pair is to be used for write accesses.

BRIEF DESCRIPTION OF THE DRAWINGS

One embodiment of the invention will now be described by way of example with reference to the accompanying drawings of which.

DESCRIPTION OF PREFERRED EMBODIMENT

General Description of Processing Unit

Figure 1:
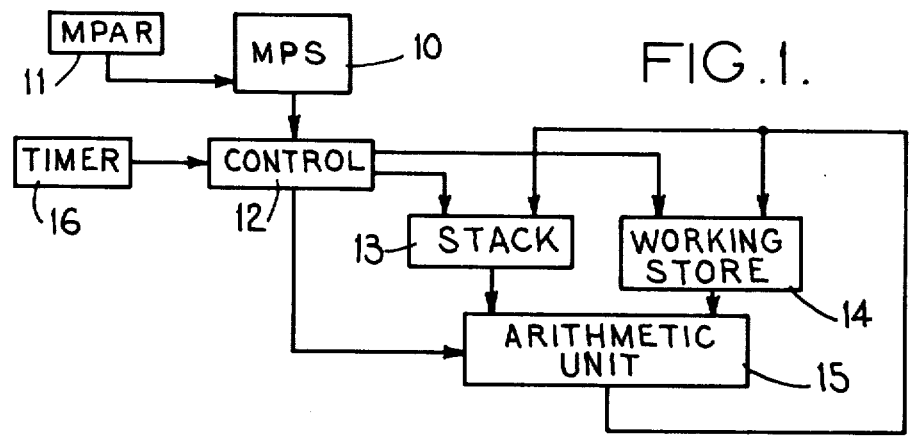
FIG. 1 is a schematic block diagram of a microprogrammed data processing unit.

Referring to FIG. 1, the processing unit contains a microprogram store 10, holding sequences of microprogram instructions.

The microprogram store is addressed by a microprogram address register 11 which is normally incremented by unity at the completion of execution of each instruction so as to step sequentially through the microprogram store.

The addressed instruction is read out of the store 10 and applied to a control unit 12 where it is decoded to generate control signals for the other parts of the processing unit. These other parts include a push-down (i.e. last in first out) operand stack unit 13, a working store unit 14 and an arithmetic unit 13.

All processing of operands is performed by the arithmetic unit. A full range of operations is available, including Add, Subtract, and so on. The arithmetic unit receives input operands from the operand stack and the working store, while the output from the arithmetic unit may be written either into the operand stack or the working store.

The control unit can also write a jump address into the microprogram address register so as to force a jump in the microprogram sequence. Such a jump may be performed as the result of tests performed by the control unit, or alternatively as the result of an Immediate Interrupt signal (II) from some external unit.

The operation of the processing unit is controlled by a timer 16, each microprogram instruction being executed in four beats of the timer. For a typical instruction involving an operation between two operands, the action at each beat is as follows:
(1) Instruction fetch. In this beat, the microprogram store is accessed to read out the instruction.
(2) Decode. The instruction is decoded in the control unit, and the operands are accessed in the operand stack and working store.
(3) Execute. The operation is performed between the operands in the arithmetic unit.
(4) Write. The result of the operation is written into the operand stack or the working store.

The present invention is concerned with a feature of the working store unit 14, which will be described in detail below. The other parts of the processing unit, shown in FIG. 1, form no part of the invention, and will therefore not be described.

WORKING STORE UNIT

Figure 2:
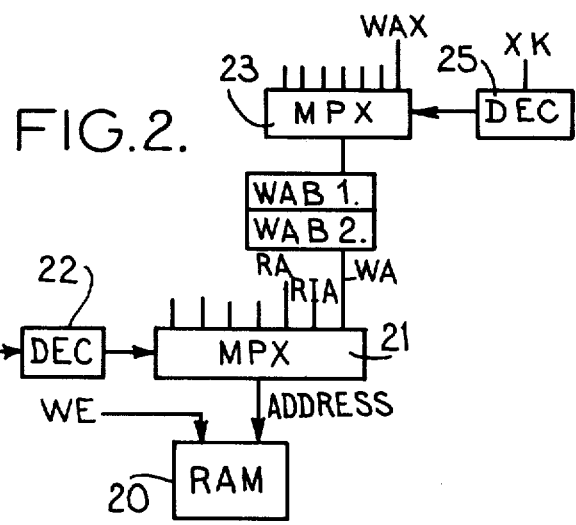
FIG. 2 shows the way in which addresses are selected within the working store unit of the data processing unit.

Referring now to FIG. 2, the working store unit includes a random access memory 20 holding 256 words, each having an eight bit address. The address input for the memory is obtained from a multiplexer 21 which selects one of seven eight-bit inputs for addressing the memory.

Only three of these inputs are relevant to the present invention:
RA: A read address.
RIA: A read-initial address.
WA: A write address derived from a write address buffer WAB2.

One of the first two (RA, RIA) can be selected for addressing the memory during the decode beat of the instruction, so as to read an operand from the store. Which one is selected is determined by a subfield of the instruction, referred to as the XK subfield which is decoded in a decoder 22 to provide a signal for controlling the multiplexer 21.

If the instruction is one which involves a write to the working store, the WA input is selected during the write beat of that instruction.

The write address WA in the buffer WAB2 is derived by way of another buffer WAB1 from another multiplexer 23, having seven inputs. The multiplexer 23 is controlled by a three-bit signal from a decoder 25 which is derived from the XK subfield. Only one of these inputs, designated WAX, is relevant to the present invention.

Thus, for each instruction, two addresses are formed simultaneously during the decode beat: a read address at the output of the multiplexer 21, and a write address at the output of the multiplexer 23. The read address can be used immediately to address the memory 20 so as to read out an operand for processing. The write address is stored in the write address buffer WAB1, is transferred to the buffer WAB2 during the execute beat, and can then be used to address the memory 20 during the write beat of the instruction. The result of the operation from the arithmetic unit will then be written into the addressed location of the memory provided that at the same time a write enable signal WE is applied to the memory from the control unit.

Figure 3:
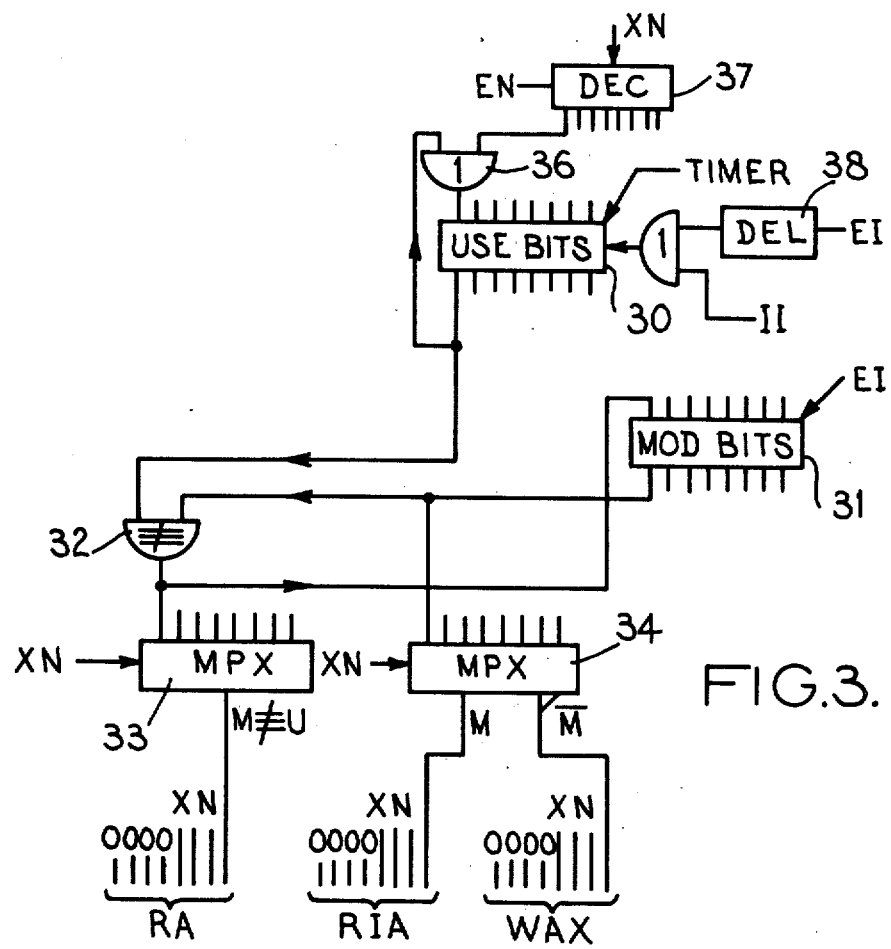
FIG. 3 shows the way in which the addresses are generated within the working store unit.

Referring now to FIG. 3, this shows how the addresses RA, RIA, and WAX are formed.

Each of these addresses consists of eight bits, the four most significant bits being zero, and the next three bits being derived from another subfield of the instruction, referred to as XN.

Thus, it will be seen that each of these addresses is limited in range to the first 16 word locations of the memory 20. Moreover, these first sixteen locations can be regarded as being grouped in eight pairs of locations, one of these pairs being selected by the XN subfield. Which member of the selected pair is actually addressed is determined by the least significant bit of the address.

The way in which these eight pairs of locations are used when addressed by RA and WAX is as follows. The two locations of each pair are used alternately to store the current value of a particular variable. The change-over from one location of the pair to the other is effected just before the first write access to that pair in a microprogram sequence for the execution of a high-level instruction. In other words, read accesses to the pair are made to one of the locations up to the first write access to that pair, that write access and subsequent read or write accesses being made to the other member of the pair. Thus, it will be seen that the value of the variable at the start of the current microprogram sequence is always preserved, even though a new value of that variable may have been written into the working store during the sequence.

If at any time it is desired to inspect this preserved initial value (e.g. for diagnostic purposes), the address RIA is used. This address always indicates the location which holds the initial value. If it is desired to re-start the sequence, using the initial values of the variables, all that is necessary is to ensure that the location of each pair which holds the initial value is reinstated as the current location.

The way in which the least significant bits of the addresses RA, RIA, and WAX are formed, so as to ensure that accesses take place to the correct location of each pair, as specified above, will now be described.

Each of the eight pairs of locations has an indicator associated with it, for indicating the present status of that pair. Each of these indicators consists of two bistable devices which respectively hold a use bit U and a modifier bit M. The use bit indicates whether any write access has taken place to that pair in the current sequence. The modifier bit indicates which location of the associated pair contained the current value at the start of the sequence.

For convenience, the eight use bits are grouped together in a register 30, while the eight modifier bits are grouped in a register 31.

The use bits are combined in eight non-equivalence gates 32 (only one shown) with their respective modifier bits. One of the eight non-equivalence results is then selected by a multiplexer 33, in accordance with the value of the XN subfield, and the selected result $M \neq U$ is used as the least significant bit of RA. It will be seen that, if the use bit is unset (i.e. $U = 0$), then $M \neq U$ will be equal to the modifier bit. Thus, read accesses using RA will take place to the initially current location. However, when the use bit is set (at the first write access) then $M \neq U$ will be equal to the inverse of the modifier bit. This ensures that read accesses following the first write access take place to the other location.

The modifier bits are also applied to a multiplexer 34 which selects one of these bits, in accordance with the value of the XN subfield. The selected bit is inverted by the multiplexer 34 to provide an output bit M which is used as the least significant bit of WAX. Thus, it will be seen that write accesses using WAX will always take place to the opposite location to the initially current one. The multiplexer 34 also provides a non-inverted output bit M which is used as the least significant bit of RIA. Thus, read accesses using RIA always take place to the initially current location, even after the first write access.

The way in which the use bits are controlled will now be described. The eight inputs of the use bit register 30 are connected to the outputs of respective OR gates 36 (only one shown) the inputs of which are, in turn, connected to respective outputs of a 3 : 8 decoder 37. The decoder 37 is controlled by a three-bit input derived from the XN subfield.

A reset signal is applied to the use bit register at the end of each microprogram sequence, as indicated by an EI signal from the control unit, so as to set all the use bits to zero. The outputs of the OR gates are clocked into the register 30 at each timer beat. Assuming that the decoder 37 is initially disabled, all its outputs will be zero and therefore all the use bits will remain equal to zero.

However, whenever an instruction occurs which involves a write using the address WAX, the control unit applies an enable signal EN to the decoder 37 at the end of the execute beat of that instruction. A binary one will thus be produced at one of the outputs of the decoder, enabling the corresponding OR gate 36 and setting the corresponding use bit to one. This bit will then remain set at one, by virtue of a feedback connection from the output of the use bit to the input of the corresponding OR gate 36, until the next EI signal.

As well as being reset at the end of a microprogram sequence, the use bit register 30 is also reset whenever an immediate interrupt signal II occurs. From the previous discussion, it will be appreciated that the effect of this is to ensure that subsequent read accesses will be made to the preserved initial value of the variable in each pair of locations.

The way in which the modifier bits are controlled is as follows. The outputs of the eight non-equivalence gates 32 are applied to respective inputs of the modifier bit register 31, which is clocked at the end of each microprogram sequence by the EI signal. Thus, each modifier bit will be set to a new value $M \neq U$. It can be seen that if no write accesses have occurred to a location pair, the associated modifier bit will be left unaltered whereas if one or more write accesses have occurred, the modifier bit will be complemented. Thus, each modifier bit is set to point to the location which holds the current value of the variable.

It should be noted that the application of the EI signal to reset the use bit register 30 is, in fact, delayed by a quarter beat with respect to the application of that signal to clock the modifier bit register 31 by a delay 38. This allows the modifier bits to be set to the appropriate value of $M \neq U$ before the use bits are reset to zero.

We claim:

1. A working store arrangement for a data processor operable to execute a plurality of sequences of instructions, some of which specify write accesses and some of which specify read accesses to the store, the arrangement comprising:

(a) a store having a plurality of pairs of locations;
(b) indicating means associated with each pair of locations and operative to indicate which location of that pair is to be used for write accesses and which location of that pair is to be used for read accesses;
(c) means responsive to an instruction specifying a read access for selecting one of the pairs of locations and for reading from the location of that pair which is indicated by the associated indicating means as the location which is to be used for read access;
(d) means responsive to an instruction specifying a write access for selecting one of the pairs of locations, writing to the location of that pair which is indicated by the associated indicating means as the location which is to be used for write accesses, and setting that indicating means to indicate that read accesses are now to take place to the location of that pair which is currently indicated for write accesses;
(e) means operable periodically for setting each indicating means to indicate that write accesses are now to take place to the opposite location of the pair to that which is currently indicated for read accesses, and
(f) means responsive to an interrrupt signal for setting each indicating means to indicate that read accesses are now to take place from the opposite location of the pair to that which is currently indicated for write accesses.

2. A working memory arrangement for a data processor operable to execute a plurality of sequences of instructions, some of which are write instructions and others are read instructions, the arrangement comprising:

(a) a store having a plurality of pairs of locations;
(b) indicating means associated with each pair of locations for indicating which location of that pair is to be used for write accesses and which for read accesses;
(c) means responsive to an instruction for selecting one of the pairs of locations and for selecting the indicating means associated with the selected pair of locations;
(d) means responsive to a read instruction for reading from that location of the selected pair which is indicated by the selected indicating means as the location which is to be used for read accesses;
(e) means responsive to a write instruction for writing to that location of the selected pair which is indicated by the selected indicating means as the location which is to be used for write accesses, and for setting the selected indicating means to indicate that read accesses are to take place to that location of the pair which is currently indicated for write accesses;
(f) means responsive to the end of a sequence of instructions for setting each indicating means to indicate that write accesses are to take place to the opposite location of the pair to that location which is currently indicated for read accesses; and
(g) means responsive to an interrupt signal for setting each indicating means to indicate that read accesses are now to take place from the opposite location of the pair to that which is currently indicated for write accesses.

3. An arrangement as claimed in claim 2 wherein each said indicating means comprises:
  means for storing use and modifier bits;
  means for forming the exclusive OR function of the use and modifier bits to produce said indication of which of the locations of associated pair is to be used for read accesses; and
  means for inverting the modifier bit to produce said indication of which location of the associated pair is to be used for write accesses;
and wherein said means responsive to a write instruction comprises;
  means for setting said use bit to a predetermined value;
and said means responsive to the end of a sequence of instructions comprises;
  means for setting each said modifier bit to the exclusive OR function of said modifier bit and the corresponding use bit, and for then resetting each use bit to an initial value.
and said means responsive to an interrupt signal comprises means for resetting each use bit to said initial value.

* * * * *